INVENTOR
DONALD O. SMITH
BY, Edward D. Thomas
AGENT

INVENTOR
DONALD O. SMITH
BY, *Edward D. Thomas*
AGENT

INVENTOR
DONALD O. SMITH
BY, Edward D. Thomas
AGENT

United States Patent Office 3,566,383

Patented Feb. 23, 1971

3,566,383

METHODS OF IMPROVING THE SIGNAL-TO-NOISE RATIO OF PHOTON AND ELECTRON BEAM ACCESSED MAGNETIC FILM MEMORY SYSTEM

Donald O. Smith, Lexington, Mass., assignor to Massachusetts Institute of Technology, Cambridge, Mass., a corporation of Massachusetts Filed Apr. 29, 1968, Ser. No. 724,847

Int. Cl. G11b *11/10;* G11c *11/42*

U.S. Cl. 340—174.1 15 Claims

ABSTRACT OF THE DISCLOSURE

Methods are described for reducing background noise in magnetic-film memories which are to be read magneto-optically with the auxiliary aid of an electron beam. In such memories the principal source of background noise is from the light which is used to illuminate the memory array. The present invention makes use of a selective background and the temperature control of magneto-optical spectra in rare-earth iron garnets, which offer highly satisfactory solution to the array noise problem. In addition, the properties of the rare-earth iron garnets are such that the fundamental signal-to-noise ratio for a single bit is improved by several orders of magnitude when compared to previously considered systems.

The invention herein described was made in the course of work performed under a contract with the Electronic Systems Division, Air Force Systems Command, United States Air Force.

The use of magneto-optical effects to read information stored in a magnetic-film memory has been considered by several authors: G. Fan, E. Donath, E. S. Barrekette, and A. Wirgin, "Analysis of a Magneto-Optic Readout System," IEEE Transactions on Electronic Computers, vol. 12, pp. 87–98, 1963; C. D. Mee and G. J. Fan, "Proposed Beam-Addressable Memory," IEEE Transactions on Magnetics, vol. MAG–3, pp. 72–76, March 1967; D. Treves, "Magneto-Optic Detection of High Density Recording," J. Appl. Phys., vol. 38, pp. 1192–1196, March 1967; and, D. O. Smith, "Magnetic Films and Optics in Computer Memories," IEEE Transactions on Magnetics, vol. MAG–3, pp. 433–452, September 1967. Three principal problems are encountered in obtaining a satisfactory signal and signal-to-noise ratio (SNR) from a random-access memory array, namely: (1) discrimination between the information contained in the interrogated bit and the rest of the array (bit selection), (2) discrimination against surface noise generated by optical imperfections in the memory array, (3) reduction or elimination of the shot noise generated by the light illuminating the unselected bits (array shot-noise). Partial solutions to these problems have been proposed which, however, for one reason or another are not completely satisfactory. For example, in a serial memory system described by Treves, cited above, the problem of surface noise was solved by means of a split-beam differential technique. However, no consideration was given to the problems of bit selection or array shot-noise which are associated with a random-access memory. In patent application No. 656,090, filed July 26, 1967, now U.S. Pat. No. 3,516,080, bit selection and discrimination against surface noise are accomplished by the combined use of photon electron beam access, herein called PEBA, to accomplish read-out. In this method, a magneto-optical signal is modulated by thermal effects induced by an intensity-modulated electron beam. However, this device is deficient in that no provision is made to reduce the array shot-noise to an acceptable level.

The following techniques for reducing array shot-noise will be discussed and compared: (1) illumination scanning, (2) detection scanning, (3) selective background, (4) magneto-optical balance, (5) temperature control of magneto-optical spectra in rare-earth iron garnets, herein called REIG. Of the several methods listed here it is found that the use of REIG spectra offers not only the best but also a highly satisfactory solution to the array shot-noise problem. It is noteworthy that in addition to virtually eliminating array shot-noise the properties of the REIG are such that the fundamental SNR for a single-bit is improved by several orders of magnitude when compared to the systems discussed in Treves and in Smith, cited above.

It is the primary object of the invention to develop a method for reducing the background shot-noise by the use of the properties of rare-earth iron garnets in a memory system employing the combination of photon and electron beams to address a thin film memory array.

(A) ILLUMINATION SCANNING

Array shot-noise can be reduced by illuminating only part of the array at a time and scanning the light beam over the array in order to obtain random access. In the limit of single-bit illumination array shot-noise is eliminated altogether and bit selection is also achieved. Illumination scanning can be considered as being either primary or secondary. In primary scanning the optical beam itself is scanned, while in secondary scanning an auxiliary electron beam is used to generate a localized source (or effective source) of light. The two cases are discussed below.

(1) Primary scanning

It is reasonably clear that the extreme of primary scanning in which each single-bit is separately illuminated is not technically practical because of the difficulties inherent in deflecting a light beam at high speed and high resolution; V. J. Fowler and J. Schlafer, "A Survey of Laser Beam Deflection Techniques," Applied Optics, vol. 5, pp. 1675–1682, October 1966. In addition, it is interesting to note that unwelcome limitations on bit size are also encountered, namely: (1) the bit diameter $d$ cannot be smaller than the diffraction limit for focusing light, i.e. $d > \lambda/\sin\theta$ where $\theta$ is the aperture angle of the optical system, cited above; (2) due to a restriction of the maximum angular aperture perpendicular to the plane of incidence [D. Treves "Limitations of the Magneto-Optic Kerr Technique in the Study of Microscopic Magnetic Domain Structures," J. Appl. Phys., vol. 32, pp. 358–364, March 1961], elongated bits longer than the diffraction limit are actually required. In the PEBA system minimum bit size is determined by the resolution of an electron beam, which can be much less than an optical wavelength.

If bit selection is achieved by some other means, e.g. the thermal modulation used in PEBA, then partial array illumination and primary scanning could be used an auxiliary technique to reduce shot-noise.

(2) Secondary scanning

Several different ways can be suggested to effect secondary scanning. For example, the scanning electron beam could be used to generate luminescence, as in a cathode-ray tube. Numerous problems seem to make such an approach impractical and a complete criticism will not be given here. It is perhaps enough to point out the intensity limitations of such sources.

Other physical effects which might be used to generate a secondary light source include the change in the index of refraction associated with the phase transition in $VO_2$ which occurs at 65° C. (Section III), and local detuning of a high-Q thin-film optical cavity (Section VI–B). No doubt there are other effects which could also be used. However, the ideas along these lines which have been considered so far do not seem to be competitive with the method of the present invention.

(B) DETECTION SCANNING

Detection scanning can be thought of as the inverse of illumination scanning. Thus single-bit detection again results in the elimination of array shot-noise and the achievement of bit selection. Detection scanning can be accomplished either by the use of multiple detectors or by sweeping a photo-electron image of the memory array past a single detector as in the conventional image-dissector: V. K. Zworykin and E. G. Ramberg, "Photoelectricity," New York: John Wiley and Sons, Inc., 1949, p. 385. For very large arrays (say $>>10^6$ bits) it seems improbable that single-bit detection will be technically possible. However, as an auxiliary technique for use with PEBA, some amount of detection scanning might probe useful.

The invention will be better understood by reference to the accompanying drawings, in which.

Figure 3:
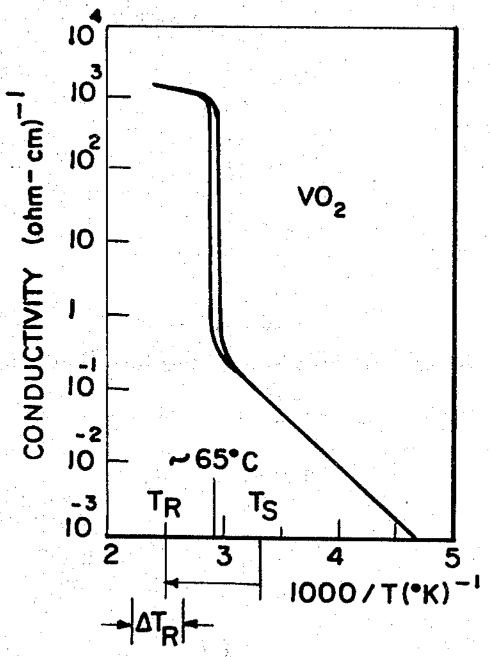

FIG. 3 is a graph showing the use of the temperature dependence of the conductivity of $VO_2$ to provide selective background light from a selected bit. (After E. N. Fuls, D. H. Hensler, and A. R. Ross, App. Phys. Letters, 10, 199 (1967).]

Figure 4:
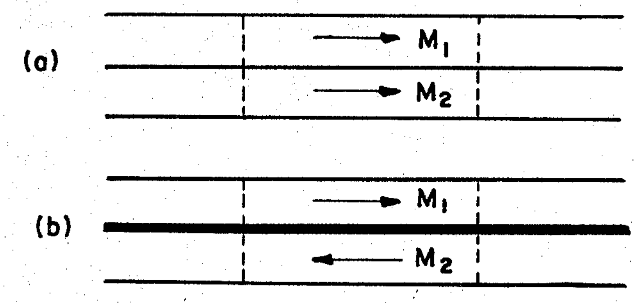

FIG. 4 is a sketch of memory bits made from composite magnetic films, in which magnetic keeper action during read-out is provided by making $T_{C1} > T_{C2}$ and coupling the films by either: (a) exchange, or (b) magnetostatic fields. The effective magneto-optical constant will be $k = k_1+k_2$ and can be made zero by making $k_1=-k_2$ or $k_1=k_2$ for exchange or magnetostatic coupling, respectively.

Figure 5:
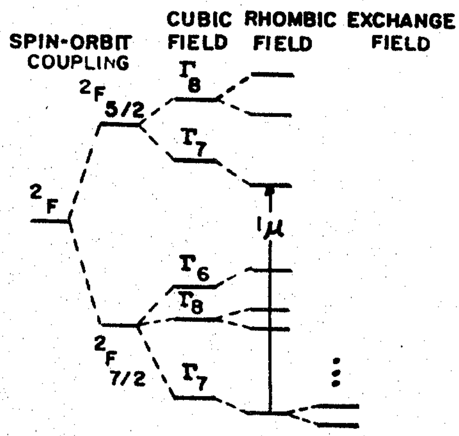

FIG. 5 is a diagram of level splitting of $Yb^{3+}$ in $Yb$IG. [After K. A. Wickersheim, Phys, Rev. 122, 1376 (1961)].

Figure 6:
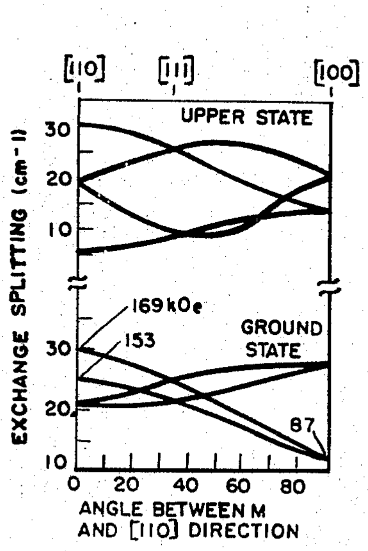

FIG. 6 is a graph showing anisotropy in the [110] plane of exchange splitting of ground state and first excited state of $Yb^{3+}$ in $Yb$IG. Four levels appear due to the four inequivalent rare-earth sites as M is rotated in the [110] plane. Some numerical values of the effective exchange field are shown in the [110] and [100] directions. [After K. A. Wickersheim, Phys. Rev. 122, 1380 (1961)].

Figure 7:
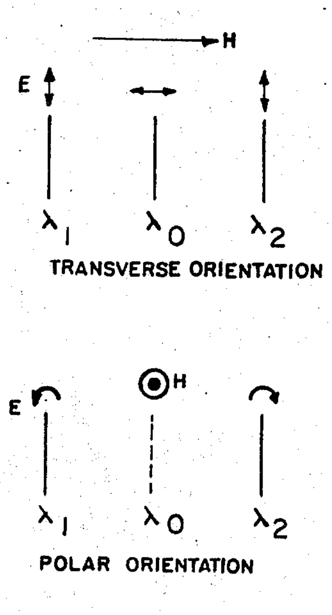

FIG. 7 is a sketch showing normal zeeman effect.

Figure 8:
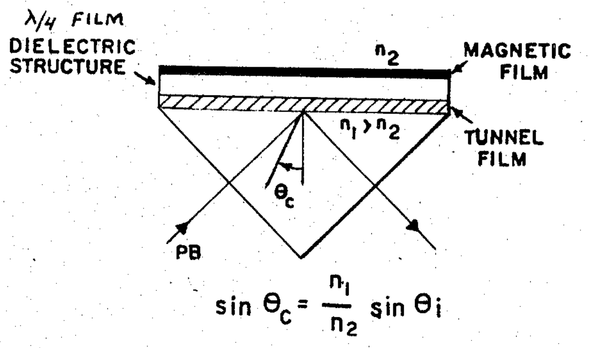

FIG. 8 is a diagram of a magnetic film in an optical cavity formed by using the effects of optical tunneling and total internal reflection.

Figure 9:
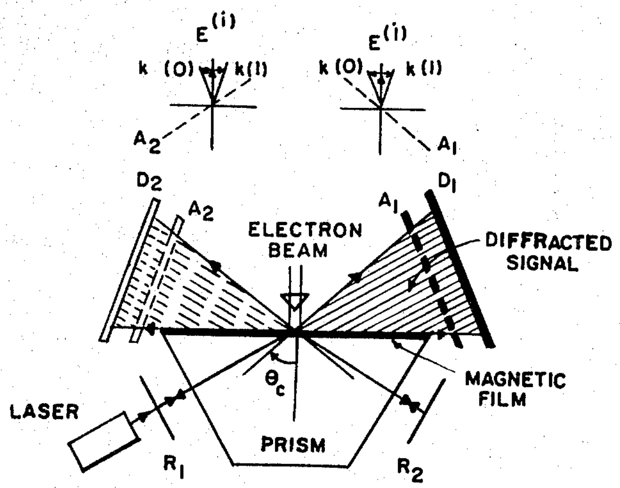

FIG. 9 is a diagram of a representative configuration for bit read-out.

Figure 10:
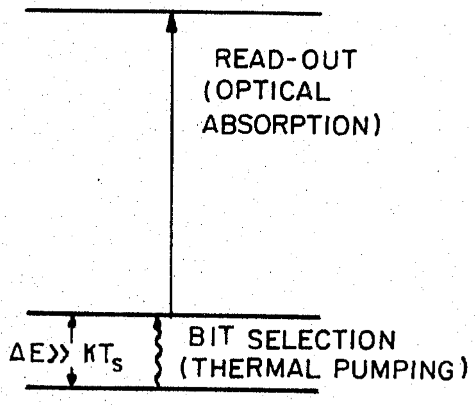

FIG. 10 is a sketch showing three-state system for bit selection by thermal pumping.

Figure 1:
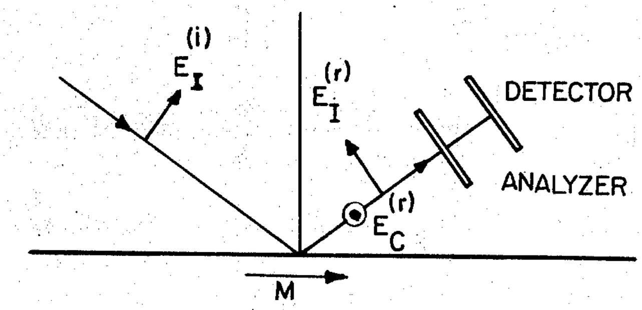
FIG. 1 is a diagram of a typical magneto-optical experiment, in which the superscripts $i$ and $r$ refer to incident and reflected waves respectively; subscripts I and C refer to incident and converted polarization modes, respectively.

A typical magneto-optical experiment is shown in FIG. 1 in which a wave polarized in the plane of incidence is incident on a magnetic surface; after reflection an additional component polarized perpendicular to the plane of incidence is present. Now define the electric field amplitude ratios $$k = E_C^{(r)}/E_I^{(i)}$$
$$k = E_I^{(r)}/E_I^{(i)} \quad (1)$$

where the superscripts $i$ and $r$ refer to incident and reflected waves, respectively, and I and C refer to incident and converted polarization modes, respectively. Then for an analyzer with transmission axis at 45° to the plane of incidence the electric field at the detector, $E_{det}$, is given by $$E_{det}=\frac{E}{\sqrt{2}}(r+k) \quad (2)$$

where for notational simplicity $E_I^{(i)} = E$. No essential point is lost in the present discussion if for simplicity it is assumed that $k$ and $r$ are real. Then the energy, W, reaching the detector is $$W=\frac{E^2}{2}(r^2+2rk+k^2) \quad (3)$$

Now the magneto-optical signal is due to the factor $k$, while $r$ can be considered as a coherent background, which is mixed with the magneto-optical signal in the square law detector. In a typical experiment $k \sim 10^{-3}$ and $r \sim 1$ so that $rk >> k^2$ and the coherent mixing provides a means of obtaining substantial signal gain. However, the shot-noise limited SNR is almost unaffected by this mixing gain. Thus with mixing ($r \sim 1$)

$$\text{signal} \propto 2kE^2 \quad (4a)$$

$$\text{Noise} \propto \sqrt{nE^2} \quad (4b)$$

$$\text{SNR} \propto \frac{2kE}{\sqrt{n}} \quad (4c)$$

where $$n = \text{number of illuminated bits} \quad (5)$$

on the other hand, without ($r = 0$ at the detector, e.g. by using a crossed analyzer)

$$\text{signal} \propto k^2E^2$$

$$\text{noise} \propto \sqrt{nk^2E^2} \quad (6b)$$

$$\text{SNR} \propto \frac{kE}{\sqrt{n}} \quad (6c)$$

Hence, the SNR is essentially the same in both cases and is severely limited by the factor $1/\sqrt{n}$.

(3) Selective Background

Figure 2:
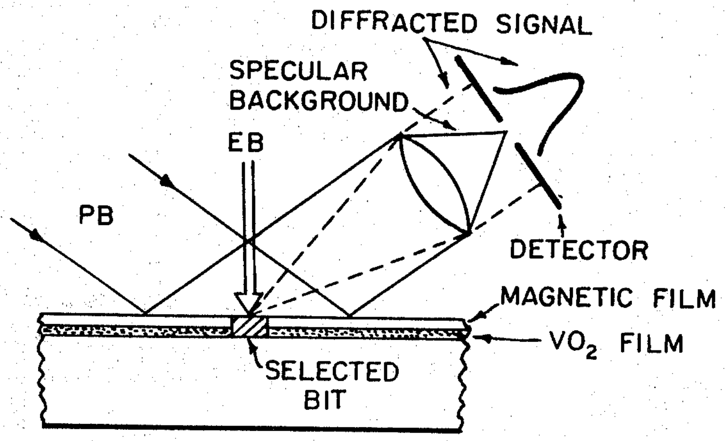
FIG. 2 is a diagram of the selective removal of background light from unselected bits and simultaneous provision of background from the selected bit.

The SNR will be improved if the background from unselected bits can be selectively removed while simultaneously providing for background with the selected bit. For this case $$\text{signal} \propto 2kE^2 \quad (7a)$$

$$\text{noise} \propto \sqrt{nk^2E^2} \quad (7b)$$

$$\text{SNR} \propto \frac{2E}{\sqrt{n}} \quad (7c)$$

which is an improvement by a factor of $k$ compared to the previous cases. One method of accomplishing the desired background conditions is shown in FIG. 2. In this example, it is assumed that the bit size is of the order of an optical wavelength, which results in a large angle diffracted wave of amplitude $k$ from the interrogated bit. The non-magnetic background from the rest of array results in a specular wave of amplitude $r$ which is focused through a hole in the center of the detector. In order to supply a background with the selected bit an auxiliary film of $VO_2$ is placed above (or below) the magnetic film. The DC conductivity of $VO_2$ is known to vary with temperature as shown in FIG. 3, which shows a sharp transition in a thin film of $VO_2$ of 5 orders of magnitude at 68° C.: E. N. Fuls, D. H. Hensler and A. R. Ross, "Reactively Sputtered Vanadium Dioxide Thin Films," Appl. Phys. Letters, vol. 10, pp. 199–201, April 1967. This conductivity change is known to persist into the near infrared [A. S. Barker, Jr., H. W. Verleur, and H. J. Guggenheim, "Infrared Optical Properties of Vanadium Dioxide Above and Below the Transition Temperature," Phys. Rev. Letters, vol. 17, pp. 1286–1289, December 1966], so that for storage and read temperatures $T_S$ and $T_{R0}$ chosen as in FIG. 3, a coherent diffracted background will be associated with the selected bit and the SNR is given by Equation $7c$. In order to generate an AC signal for bit selection and also provide discrimination against surface noise, an excursion $\Delta T_R$ of the read temperature is also indicated in FIG. 3.

(4) Magneto-Optical Balance

In principle the array shot-noise can be eliminated by making $k=0$ for all but the selected bit. In practice $k$ will not be exactly zero so that with the non-magnetic array background removed, say by the use of a crossed analyzer or the diffraction technique of FIG. 2, the SNR will be given by $$\text{signal} \propto k^2E^2 \quad (8a)$$

$$\text{Noise} \propto \sqrt{n|\delta k|^2}E^2 \quad (8b)$$

$$\text{SNR} \propto \frac{k^2E}{\sqrt{n|\delta k|^2}} \quad (8c)$$

where:

$$\sqrt{|\delta k|^2} = \text{RMS deviation of } |k| \text{ from zero} \quad (9)$$

Several ways can be proposed to make $k=0$. For example the use of a composite memory film has been described in patent application No. 656,090, noted above, in order to provide a magnetic keeper during read-out. Two exchange coupled films having different Curie points, $T_{C1}$ and $T_{C2}$, were used with read-out taking place near the lower Curie point (FIG. 4*a*). The effective magneto-optical constant $k=k_1+k_2$ will be zero if the films are chosen so that $k_1=-k_2$. A number of difficulties arise with this exchange coupled configuration, namely: (1) the external field required for writing must be greater than the magneto-static field from adjacent bits; (2) in practice it will be difficult to find materials with $k_1=-k_2$, particularly since $k$ is in general complex.

The difficulties encountered with exchange coupled films are reduced by using magnetostatically coupled films (FIG. 4*b*). In this case, keeper action is again accomplished by making $T_{C1}>T_{C2}$. However, the field necessary for writing will be less since the magnetostatic fields from adjacent bits is reduced, as cited above. Furthermore, the condition $k=0$ now requires $k_1=k_2$, which is much easier to accomplish since the two films can be of almost the same material. As will be discussed in Sections V and VI, magnetic garnets make excellent memory films. In these materials it is possible to adjust film compositions so as to obtain the condition $T_{C1}>T_{C2}$, while simultaneously approximating the condition $k_1=k_2$.

(5) Magneto-Optical Spectra in REIG (A) Summary of magnetic and optical properties of REIG The REIG have been extensively studied in recent years. The magnetic and optical properties of these materials will be qualitatively summarized and related to use in a PEBA memory system.

The composition of the REIG is $M_3Fe_2Fe_3O_{12}$, where M is any rare earth from Sm through Lu. The magnetization vs. temperature curves for these materials is given in the well known curves of Pauthenet: R. Pauthenet, "Spontaneous Magnetization of Some Garnet Ferrites and the Aluminum Substituted Garnet Ferrites," J. Appl. Phys. vol. 29, pp. 253–255, March 1958. The Curie points are all nearly the same ($T_C \sim 560°$ K.) and are determined by exchange coupling between iron atoms. The iron atoms form two inequivalent sublattices coupled antiferromagnetically with a resultant net moment. The rare earths form a separate sublattice coupled antiferromagnetically and somewhat weakly to the net iron moment. In some of these materials the rare earth moment can exceed the iron moment at low enough temperature. With increasing temperatures the rare earth moment decreases more rapidly than the iron moment, resulting in a "compensation" temperature at which the overall net magnetization is zero. Above the compensation temperature the magnetization changes sign.

With respect to the use of coupled films in PEBA (Sec. IV), films of different $T_C$ are required and in addition $T_C$ must not be so high that thermal writing is difficult. The Curie points of the REIG can be lowered by a partial substitution for iron, e.g. Ga substitution. Furthermore, the conditions for magneto-optical balance can be realizable by varying the rare-earth concentration.

The optical properties of REIG are most notable by the fact that there is a "window" in the near infrared ($\sim$1.5 to 5$\mu$) within which the absorption is essentially zero except for the line spectrum of electronic transitions in the rare-earth ions: R. C. LeCraw, D. L. Wood, J. F. Dillon, Jr. and J. P. Remeika, "The Optical Transparency of Yttrium Iron Garnet," Appl. Phys. Letters, vol. 7, pp. 27–28, July 1965; and D. L. Wood and J. P. Remeika, "Effect of Impurities on the Optical Properties of Yttrium Iron Garnet," J. Appl. Phys., vol. 38, pp. 1038–1045, March 1967. Furthermore, it is notable for the memory application that these rare-earth line spectra are split into components by exchange interaction with the iron sublattices resulting in sharp-line magneto-optical effects: K. A. Wickersheim and R. L. White, "Optical Observation of Exchange Splitting in Ytterbium Iron Garnet," Phys. Rev. Letters, vol. 4, pp. 123–125, February 1960; and K. A. Wickersheim, "Spectroscopic Study of the Ytterbium-Iron Exchange Interaction in Ytteribum Iron Garnet," Phys. Rev., vol. 122, pp. 1376–1381, June 1961.

In addition to the magneto-optical effects associated with the rare-earth electronic-transition spectra, there is frequency independent Faraday rotation present within the optical window of the REIG: G. S. Krinchik and M. V. Chetkin, "Magneto-Optical Properties of Garnet Ferrities in the Infrared Region," Soviet Physics JETP, vol. 13, pp. 509–511, September 1961; G. S. Krinchik and M. V. Chetkin, "Exchange Interaction and Magneto-Optical Effects in Ferrite Garnets," Soviet Physics JETP, vol. 14, pp. 485–490, March 1962; and M. V. Chetkin and A. N. Shalygin, "Exchange Interaction and the Temperature Dependence of the Faraday Effect in Ferrimagnets," Soviet Physics JETP, vol. 25, pp. 580–581, October 1967. The physical origin of this broad band Faraday rotation has been shown to be due to spin precession of the rare earth and iron sublattices in the exchange fields between them. Consequently the REIG are bigyrotropic, i.e., both the $\epsilon$ and $\mu$ tensors must be taken as skew symmetric: D. O. Smith, "Magneto-Optical Scattering from Multi-Layer Magnetic and Dielectric Films, Part I, General Theory," Optica Acta, vol. 12, pp. 13–45, January 1965. It is relevant to the PEBA memory problem to note that, analagous to the magnetic compensation temperature at which $M=0$, a gyromagnetic compensation temperature also exists at which the gyromagnetic effect is zero, cited above. Further discussion relative to the PEBA memory is given in Section VI–D.

The utility of the REIG for PEBR memory systems arises for two reasons: 1) The magneto-optical efficiency of these materials is exceptionally high; 2) the characteristic sharp-line magneto-optical spectra can be used to reduce or even virtually eliminate array shot-noise. Discussions of these aspects of the memory use of the REIG are given in Sections 6–A and D, respectively.

(B) Qualitative description of magneto-optical effects (1) Exchange splitting in Y*b*IG.—The energy levels of the 4*f* electrons in a rare-earth ion can be described in terms of the L–S coupling scheme in which the orbital and spin angular momenta, $l_i$ and $s_i$, respectively of each electron are first combined to form $L=\Sigma l_i$ and $S=\Sigma s_i$. Subsequently, L and S are coupled by spin-orbit coupling to form a resultant J. For example, the lowest states of the $Yb^{3+}$ ion arise from the spin-orbit splitting of the $^2F$ state, giving rise to a $^2F_{7/2}$ ground state and a $^2F_{5/2}$ excited state [recall that in the standard spectroscopic notation the superscript gives the value of $2S+1$, the main symbol gives the value of L, while the subscript is the value of J] (see FIG. 5). When such an ion is placed in a crystal the levels are split by the crystal field, but because the 4$f$ electrons have small radial extent, this crystal-field splitting is less than the spin-orbit splitting. For $Yb^{3+}$ in non-magnetic yttrium gallium garnet (YGG) the resultant levels are shown in FIG. 5. Finally, in the magnetic crystal ytterbium iron garnet (Y$b$IG) the $Yb^{3+}$ levels are further split by exchange fields. This splitting for the ground state and the first excited state are shown schematically in FIG. 5. [$Yb^{3+}$ has an odd number of electrons and hence is a Kramers ion: V. Heine, "Group Theory in Quantum Mechanics," London: Pergamon Press, 1960, p. 169. For such ions each level is at least doubly degenerate in the absence of magnetic fields or exchange effects. Hence the effect of exchange in $Yb^{3+}$ must be to split the rhombic field levels into doublets (FIG. 5).

The actual exchange splittings in the REIG are found to be highly anisotropic, depending on the direction of the magnetization M with respect to the crystal lattice. This anisotropy arises because of the strong spin-orbit coupling, which causes the electron wave functions to rotate with M with consequent variation in the exchange integrals with the iron atoms. Further complication arises due to the fact that in the garnet structure the rare earth ions are present on six magnetically inequivalent sites, a fact which is best understood by examining a model of the garnet structure. Experimental data for the actual exchange splitting of the ground and first excited states of $Yb^{3+}$ is shown in FIG. 6. Note that by constraining M to lie in the [110] plane, the number of inequivalent sites has been reduced from six to four.

(2) Normal exchange-Zeeman effect in E$u$IG.—In addition to the splitting of energy levels due to exchange, polarization effects also occur. The observed effects bear some resemblance to the Zeeman effect, in which spectral lines are split and polarized by an external field. In L–S coupling the energy levels are shifted by an amount $$\Delta E = g_L \beta H M_J \quad (10)$$

where $\beta$ and $g_L$ are the Bohr magneton and Landé $g$ factor, respectively, given by $$\beta = \frac{e\hbar}{2mc}$$

$$g_L = 1 + \frac{J(J+1) + S(S+1) - L(L+1)}{2J(J+1)} \quad (11)$$

For the normal Zeeman effect $S=O$ and the wavelength and polarization effects on a spectral line are shown schematically in FIG. 7 for light propagating | to H (transverse orientation and || to H (polar effect), respectively. Similar exchange-Zeeman spectra are predicted and have been observed. Analagous to Equation 10, an effective exchange field of $H_{eff}$ can be defined by $$\Delta E_{exchange} = \beta g H_{eff} \quad (12)$$

where the $g$ factor is taken from paramagnetic resonance data. Experimentally $H_{eff}$ is found to be of the order of $10^5$ oe.

In general, the exchange spectra of the rare earth ions will be much more complicated than the simple case shown in FIG. 7. In certain situations, however, simple spectra are to be expected. Exchange effects on the ${}^7F_0 \rightarrow {}^7F_6$ and ${}^7F_0 \rightarrow {}^7F_4$ transitions in $Eu^{3+}$ are relatively simple since the ${}^7F_0$ state is not split by crystalline fields. These transitions have been studied by Krinchik et al., cited above, and [G. S. Krinchik, "Magneto-Optical Properties of Rare-Earth Ions in Ferromagnetic Crystals," Soviet Physics JETP, vol. 5, pp. 273–277, August 1963; and G. S. Krinchik and G. K. Tjutnera, "Results of Magneto-Optical Investigation of Rare Earth Iron Garnets," J. Appl. Phys., vol. 35, pp. 1014–1017, March 1964] who obtain results qualitatively similar to FIG. 7. Since the crystal field and exchange splittings are found to be of the same order of levels of different $M_J$, with a consequent breaking of the polarization selection rules.

(6) Memory Use of REIG Spectra

(A) Magneto-optical efficiency

Until recently, ferromagnetic materials have been optically lossy. In order to obtain a convenient and quantitative measure of the usefulness of such materials in technical applications of magneto-optical effects, a magneto-optical quality factor $f$ has been inroduced by several authors, as cited above, and: J. F. Dillon, Jr., H. Kamimara, and J. P. Remeika, "Magneto-Optical Studies of Chromium Tribromide," J. Appl. Phys., vol. 34, pp. 1240–1247, April 1963.

$$f = f/\alpha \quad (13)$$

where:

F=Faraday rotation (rad/cm.)
$\alpha$=attenuation constant (cm.$^{-1}$) (14)

For bulk materials $f$ is simply the amount of rotation of the polarization which has occurred by the time that the light amplitude has been reduced by $1/e$. Alternatively state, $f$ measures the amount of energy converted between orthogonal polarization modes before being dissipated by loss. Stated in this way, it is clear that $f$ is a general parameter which can be used as an index of material performance in any magneto-optical configuration, such as, e.g., the Kerr effect in thin films. Furthermore, it is alos clear than such an index is only of value when $f \lesssim 1$ or 2, since rotations of more than $\sim\pi$ are not technically useful. In other words, all materials with $f \gg 1$ are equally good measured in this way. This point has sometimes been overlooked in reporting the properties of new magnetic materials.

For the REIG for wavelengths between 1.5 and 5$\mu$ F is found to be of the order of 2 to 20 rad/cm., while $\alpha$ is reoprted as $<0.01$ cm.$^{-1}$, as cited above. Hence for these materials $f \gg 1$ and other considerations will determine their usefulness.

(B) Impedance and conversion matching

In order to obtain large optical effects from very thin films, it is in general necessary to take some measures to couple the incident optical wave into the film, i.e., to make provision for impedance matching. More generally, in the case of magneto-optical effects, energy is converted from one polarization normal-mode to another and the additional concept of "conversion" matching arises, cited above. The problem of magneto-optical impedance and conversion matching to films of the REIG is particularly important due to the small absolute value of the rare-earth absorptions and the concommitant magneto-optical effects. [In the free ion the transitions of interest are forbidden electric-dipole transitions. The transitions observed in crystals are either magnetic-dipole or, more usually, weak electric-dipole arising from the breaking of selection rules by crystal-field perturbations. The long lifetime associated with forbidden transitions is discussed in Section 4–C2, in connection with read cycle time.] By way of comparison, the Faraday constants for E$u$IG and F$e$ are $\sim$20 and 2000 rad/cm., respectively. As an additional comparison, for the case of the transverse magneto-optical orientation an effective magneto-optical absorption constant can be defined as a $$\alpha_q'' \simeq \pi n q''/\lambda_0$$

where $q=q'+iq''$ is the off-diagonal element of the gyroelectric dielectric tensor. Then from $F=(\pi/\lambda_0)$ $[nq]$, and assuming $[g] \sim g''$, gives $F \simeq \pi n q''/\lambda_0$. Hence $$\alpha q'' \simeq F \quad (15)$$

which for the REIG gives a small value for the absorption constant ($\alpha_{metal}$~$10^5$ cm.$^{-1}$).

A proper treatment of magneto-optical impedance and conversion matching will not be attempted here. The general theoretical approach is well known but has only been applied to date to the case of lossy materials, i.e., $f \ll 1$, as cited above, and: D. O. Smith, "Magneto-Optical Scattering From Multi-Layer Magnetic and Dielectric Films, Part II. Applications of the General Theory," Optica Acta, vol. 12, pp. 193–204, April 1965; and D. O. Smith and K. J. Harte, "Improved Method of Optimizing Longitudinal Magneto-Optical Transmission-Scattering in Thin Magnetic Films," Optica Acta, vol. 14, pp. 351–365, October 1967. Theoretically, for materials with $f \gg 1$, and for films with planar dimensions $\gg \lambda$, it is clear that matching dielectric structures can be designed such that nearly 100% coupling between the incident wave and the magneto-optical properties of the film can be obtained. The immediate problem then is to estimate the extent to which pratical matching to bits of dimension $\lesssim \lambda$ can be accomplished. Consider first the case of film dimensions $\gg \lambda$. The matching problem can be thought of in terms of generating large optical electric fields by means of cavity resonators. An example of such a resonator which appears to be uniquely suited to the present problem is shown in FIG. 8. An optical standing wave is generated within a dielectric and magnetic film structure by using the effects of optical tunneling and total internal reflection. Such structures have been considered by many authors and experiments have shown that Q's~100 to 1000 can be obtained: D. W. Baumeister, "Optical Tunneling and Its Applications to Optical Filters," Appl. Optics, vol. 6, pp. 897–905, May 1967; and A. E. Gee and H. D. Polster, "A Method for Measuring Extremely Small Non-Uniformities inthe Optical Thickness of Evaporated Films," J. Opt. Soc. Am., vol. 39, pp. 1044–1047, December 1949. A direct quantitative evaluation of magneto-optical matching using these Q values is not possible. However, it seems reasonable to expect that a high degree of matching can be obtained for large area films. The question of matching to small bits is outside the range of the present theory.

(C) Bit read-out (1) Representative read-out configuration.—Various detailed methods of reading the value of a bit can be devised. A discussion of the general problem must consider the polarization state of the incident light (linear or circular), and the presence or absence of a coherent background. The effects of these conditions on the read-out and storage states are summarized in Table I. For linear incident light and a coherent background of the incident mode, all of the familiar techniques associated with the transverse, longitudinal, or polar Kerr or Faraday effects can be used. An example of a configuration well suited to the PEBA memory is shown in FIG. 9. In this example, the incident optical field is enhanced by placing the memory film in an optical cavity formed by reflectors $R_1$ and $R_2$; further enhancement is effected by the use of a dielectric-film cavity, as described in FIG. 8. The signal arises from diffraction due to one of the several magneto-optical Kerr or Faraday effects, while a coherent background of the incident-mode polarization is generated by local Q-spoiling due to thermal heating by the electron beam. In order to discriminate against diffraction from surface effects or any other DC perturbations, an AC signal can be generated by modulating the temperature of the bit, which then results in a modulation of the exchange field discussed in Section 5–B. The AC component generated by the incident-mode background can be cancelled by using the differential arrangement of Treves, cited above. Two optical channels are used with analyzers oriented antisymmetrically as shown in FIG. 9.

In the absence of a coherent background, the diffracted signal is proportional to $k^2$ and hence is independent of the sign of M. Hence the storage states must be spatially orthogonal in order to distinguish the value of a bit.

TABLE I.—SUMMARY OF BIT READ-OUT CONDITIONS

| Incident-mode polarization | Incident-mode background | Read-out effect | Storage states |
|---|---|---|---|
| Linear | Present | Traverse, longitudinal or polar Kerr or Faraday effects. | Uniaxial.* |
| | Absent | | Orthogonal. |
| Circular | | Longitudinal or polar Zeeman effect. | Uniaxial.* |

*Could also be orthogonal.

The case of circularly polarized incident light is easily discussed for normal incidence. Then there are no mode distinctions and the idea of incident-mode background does not enter. It is clear from FIG. 7 and the discussion of exchange splitting that bit read-out of the diffracted signal from uniaxial storage states using the polar Zeeman effect is possible. At oblique incidence, which would be required for storage with the magnetization in the plane of the film, complications occur due to the different surface impedances of the two constituent linear polarization modes.

The problem of generating magnetic fields for writing should be mentioned. In the configuration of FIG. 9, it is impossible, or at least awkward, to provide flat conductors near the memory film. For memory arrays with dimensions of the order of centimeters, it then becomes necessary to supply fields over volume of several cubic centimeters. For an arbitrary sequency of pulse fields with rise time $\lesssim 1\mu$ sec this becomes a difficult electronics problem. A convenient solution might be to supply a continuous *rf* field from a high-Q coil or cavity system. Writing would then be accomplished by selecting the appropriate part of the RF cycle to heat the selected bit.

(2) Lifetime quenching.—The rare-earth spectra under consideration occur as forbidden electric-dipole transitions, cited above. Hence the radiactive lifetime $\tau_r$ of the excited states will be long relative to allowed electric dipole transitions. From experiment $\tau_r \sim 10^{-3}$ sec. which could result in a severe limitation on the cycle time for reading one particular bit. A solution to this problem can be obtained by providing other modes of decay from the excited state. For example, if there are multiple energy levels between the excited and ground state, then electrons may cascade downward in energy by means of phonon interactions. In fact, such modes of decay are the rule and not an exception, and provide the explanation of why only very few of the excited states of rare-earth ions are suitable as laser emission states.

Lifetime quenching can also be accomplished by means of interactions between different rare-earth ions: L. G. van Uitert and S. Iida, "Quenching Interactions Between Rare-Earth Ions," J. Appl. Phys., vol. 37, pp. 986–992, September 1962. In fact, such coupled-ion effects are commonly used in laser work in order to optimize pumping to certain states. Extensive discussion of these effects with respect to the PEBA memory would be premature at this time. However, it seems reasonable to suppose that in the light of these known coupled-ion quenching effects, that no read cycle-time limitations will be encountered which cannot be overcome.

(D) Reduction of array shot-noise

Array shot-noise can be reduced and in fact virtually eliminated by using temperature effects to control REIG spectra. Two different effects can be distinguished, namely: (1) thermal shifting of the position of spectral lines, and (2) thermal pumping to the state from which absorption is to take place. These effects are considered separately below.

The presence of the broad-band gyromagnetic Faraday effect mentioned in Section 5–A will generate array shot-noise which will not be eliminated by temperature control of the sharp-line electronic spectra. Several effects can be utilized to reduce this source of array shot-noise, namely: (1) magneto-optical balance (Section 4), (2) placement of the memory film in the optical cavity of FIG. 8 at a position of maximum E and minimum H, (3) choose the storage temperature to coincide with the gyromagnetic compensation temperature (Section 5–A).

(1) Thermal shifting of spectral lines.—The exchange splitting of energy levels in REIG has been discussed in Section 5–B. Now since this splitting depends on the magnetization of the *Fe* sublattices, it is expected that the temperature dependence of the exchange splitting will closely parallel that of the net magnetization. Such temperature dependence has in fact been reported by Krinshik and Tjutneve, cited above. Hence, it is clear that by proper choice of incident wavelength and for sharp enough spectral lines with sufficient exchange splitting, that a magnetic film memory plane could be made to appear homogenous and transparent except for one selected (heated) bit. Then the array illumination could be eliminated by taking advantage of either its specular or polarization character.

In practice complicating factors will probably limit the effectiveness of this form of array discrimination. For example, the anisotropy in the exchange splitting (cf. FIG. 6) is of the same order as the exchange splitting. Hence line broadening of the order as the line spacings will occur in polycrystalline film. A single-crystal memory film might be a practical possibility, although considerable complication in fabrication would be expected. Furthermore, from general micromagnetic considerations, the minimum bit size possible in a single-crystal film is expected to be larger than in a polycrystalline film of the same thickness.

(2) Thermal pumping.—The most effective and practical form of array discrimination appears to be thermal pumping. Consider the three-state energy system of FIG. 10 in which bit selection occurs by thermal (phonon) pumping from a ground state to a nearby intermediate state, while readout is by optical absorption from this intermediate state to a higher excited state. By the usual statistics the population of the intermediate state is given by $$N=N_g e^{-\Delta E/\beta} \quad (16)$$

where:

$N$=number of electrons in the intermediate state
$N_g$=number of electrons in the ground state
$\Delta E$=energy separation between ground and intermediate states $$\beta=kT \quad (17)$$

Then the factor $\eta$ by which the electron population of the unselected or stored bits is attenuated relative to the selected or read bit is $$\eta=N_S/N_R=e^{-(\Delta E/\beta_S)(1-\beta_S/\beta_R)} \quad (18)$$

where the subscripts S and R designate the storage and read temperatures, respectively. The factor $\rho$ by which the read-bit population is attenuated when compared to a fully populated intermediate state is given by $$\rho=N_R/N_g=e^{-\Delta E/\beta_R} \quad (19)$$

The effect of electron population on the gyroelectric (off-diagonal) components of the dielectric tensor can be obtained by reference to classical dispersion, theory, from which the Faraday effect is: A. Sommerfeld, "Optics," New York: Academic Press, 1954, p. 104.

$$n_+ - n_- \alpha N \quad (20a)$$

In terms of the off-diagonal element, $q$, of the gyroelectric tensor $\epsilon$ we have, cited above $$n_+ - n_- = q \quad (20b)$$

so that $$q \alpha N \quad (20c)$$

Then the relation between $q$ for the stored and read bits is $$q_S=\eta g_R \quad (21a)$$

similarly the attenuation of $g_R$ relative to the $g_0$ which would obtain for a fully populated intermediate state is given by $$g_R=p g_0 \quad (21b)$$

Since magneto-optically diffracted fields will be proportional to $g$, the magneto-optically diffracted energy will be proportional to $g^2$. Then with no background from the incident mode the signal, array shot-noise and SNR are found to be $$\text{signal} \propto q_R^2 E^2 \quad (22a)$$

$$\text{noise} \propto \sqrt{n q_S^2 E^2} \quad (22b)$$

$$\text{SNR} \frac{p q_0 E}{\sqrt{n \eta^2}} \quad (22c)$$

This result is to be compared to the SNR for the case of no mixing with a background and also no attenuation of the unselected bits (Equation 6*c*). It is seen that for a given SNR and by using thermal pumping, $\eta^2$ more bits can be simultaneously illuminated.

As a numerical example take $$\beta_S=55 \text{ cm.}^{-1} \quad (T_S \simeq 77° \text{ K.})$$
$$\beta_S/\beta_R=1/5 \quad (T_R \simeq 100° \text{ C.}) \quad (23)$$
$$\Delta E/\beta_S=10 \quad (\Delta E \simeq 500 \text{ cm.}^{-1}, \text{ a reasonable value for the rare-earths}):$$

"Progress in Optics," vol. 6, Academic Press, 1967.

so that $$\eta \simeq 3 \times 10^{-4}$$
$$\rho \simeq 10^{-1} \quad (24)$$

Thus for given $n$ and SNR without thermal pumping, $\sim n \times 10^7$ bits can be simultaneously illuminated by using thermal pumping. Note that te effect of matching can be thought of as being implicit in the SNR of Equation 22*c* in the sense that the electric field E must be made large enough, either by increasing the incident field or by the use of an optical cavity (i.e. matching), to reach an acceptable SNR.

If the heating associated with selecting a bit is sufficient to perturb the optical cavity to such an extent that a large component of the incident field is also diffracted (see Sec. 6–B), then the SNR calculation gives $$\text{signal} \propto q_R E^2 \quad (25a)$$

$$\text{noise} \propto \sqrt{n g_S^2 E^2} \quad (25b)$$

$$\text{SNR} \propto \frac{E}{\sqrt{n \eta^2}} \quad (25c)$$

To summarize and to set forth by way of illustration a preferred embodiment of the invention, attention is called to FIGS. 4*b*, 8, 9 and 10. The magnetic film of FIG. 8 is considered to be the composite magnetic film of FIG. 4*b*. The optical cavity formed by the magnetic film, the dielectric structure and tunnel film of FIG. 8 is considered to replace the magnetic film of FIG. 9.

The information is assumed to be in digital form stored in bits which are magnetized to saturation in either direction. The read-out system of FIG. 9 as so modified, uses linearly polarized light from a laser source. The incident optical field is enhanced by the use of the optical cavity formed by the prism and reflectors, $R_1$ and $R_2$. The optical electric field is further enhanced by means of the cavity resonator, shown in FIG. 8, using the magnetic film, dielectric film and tunnel film where the film surfaces act as reflectors. The optical system generates an optical standing wave within the dielectric and magnetic film structure by making use of the effects of optical tunneling and total internal reflection and the magnetic film is located at a position of maximum electric field and minimum magnetic field. The optical system also acts as a beam splitter producing two output signal beams which arise from diffraction, as explained previously. The outputs of detectors $D_1$ and $D_2$ of FIG. 9 may be combined in a differential amplifier in such a manner that the background noise cancel and the magneto-optical signals enhance to produce an advantageous signal-to-noise ratio.

As explained previously, the electron beam of FIG. 9 is used for bit selection, since the electron beam can be focussed to a very small diameter spot and accurately deflected to a predetermined selected spot in the random access memory array. The function of the electron beam to aid in the reduction of array shot-noise is related to the temperature effects to control the rare earth iron garnet spectra. The preferred embodiment makes use of the thermal pumping operation described previously, in order to obtain a large illuminated film area for a given signal-to-noise ratio.

The above description of the invention is intended to be illustrative and not limiting. Various changes and modifications in the embodiments described may be made within the concepts discussed and these may be made without departing from the spirit or scope of the invention as set forth in the claims.

I claim:

1. In a random access thin film magnetic memory array having information stored as the direction of magnetization in bit storage areas in the film and using an intensity modulated electron beam for selecting a particular bit storage area and a polarized optical beam to sense the stored information as a modulated magneto-optical signal reflected from the selected area, apparatus for producing an optically homogenous background from unselected bits and a magneto-optical signal thermally activated from the selected bit comprising:
- a beam of polarized monochhromatic light for the illumination of said apparatus,
- an optical cavity resonator placed in the path of said beam and adapted to enhance the optical electric field of the resultant optical standing wave,
- a thin optically transparent film of magnetic material placed on a surface of said resonator at the maximum electric field,
- a source of an intensity modulated electron beam adapted to be deflected to select any desired information bit storage area on said film whereby the selected area is heated by said beam to provide a thermally activated magneto-optical signal,
- and optical means for separating the magneto-optical signal from the background beam.

2. The apparatus defined in claim 1 wherein said electron beam is focused to a beam diameter smaller than an optical wavelength to produce a diffracted magneto-optical signal.

3. The apparatus as defined in claim 2 wherein said optical means includes a detector having a small insensitive area and a lens placed between said film and said detector to collimate said diffracted magneto-optical signal from said selected bit area and to focus the specular background signal from unselected bits on said insensitive area of said detector.

4. The apparatus as defined in claim 3 wherein said magnetic film is supported by a film of vanadium oxide whereby the temperature variation of conductivity of vanadium oxide produces a coherent diffracted background mixing signal associated with the selected bit area.

5. The apparatus defined in claim 2 wherein said thin film of magnetic material is a composite film of two magnetostatically coupled magnetic films having different Curie points, substantially equal magnet moments and substantially equal magneto-optical constants at the storage temperature to eliminate background noise signals by magneto-optical balance.

6. The apparatus defined in claim 5 wherein said two magneto-statically coupled films are two rare earth iron garnet films having different Curie points and substantially equal magneto-optical constants at the storage temperature and represented by the formula $M_3Fe_2Fe_3O_{12}$, where M is any rare earth element.

7. The apparatus defined in claim 2 wherein said optical cavity resonator includes a prism and a pair of reflectors arranged with said light beam perpendicular to one of said reflectors and a surface of said prism and said magneto-optical signal is diffracted in two divergent beams.

8. Apparatus as defined in claim 7 wherein said thin film of magnetic material is a rare earth iron garnet, represented by the formula $M_2Fe_2Fe_3O_{12}$, and in which said electron beam acts on said selected bit area to produce thermal pumping of said rare earth iron garnet from a ground state to a nearby intermediate state thereby permitting optical absorption from said intermediate state to a higher excited state to produce a read-out signal.

9. The apparatus defined in claim 7 wherein said optical resonator includes a second optical cavity formed by said magnetic film and a quarter wave dielectric film layer coupled to said first cavity by a dielectric tunnel film for further enhancement of the optical electric field.

10. The apparatus defined in claim 9 wherein said thin film of magnetic material is a rare earth iron garnet, represented by the formula $M_3Fe_2Fe_3O_{12}$, where M is any rare earth element.

11. The apparatus as defined in claim 9 wherein a coherent diffracted background mixing signal is obtained from the selected bit area by the thermal perturbation of said second optical cavity resonator.

12. The apparatus defined in claim 7 wherein said thin film of magnetic material is a rare earth iron garnet, represented by the formula $M_3Fe_2Fe_3O_{12}$, where M is any rare earth element.

13. The apparatus defined in claim 12 wherein said electron beam thermally actives said selected bit area to shift the wavelength of shape-line magneto-optical exchange split spectra of said rare earth element, said spectra being anisotropic depending on the direction of magnetization with respect to the crystal lattice.

14. Apparatus defined in claim 7 wherein said optical means includes a pair of analyzers oriented antisymmetrically, one placed in the path of each of said divergent beams and a detector for the output of each analyzer responsive to said modulated signal to discriminate against steady state perturbations and adaptable to cancel any fluctuating component of the incident mode background by differential combination of the two analyzer outputs.

15. The apparatus as defined in claim 14 wherein a coherent diffracted mixing signal is obtained from the selected bit area by the thermal perturbation of said optical cavity resonator.

References Cited

UNITED STATES PATENTS 3,247,495 4/1966 Fuller ............. 340—174

OTHER REFERENCES

Publication I, Magnetic Recording Technique, IBM Tech Discl. Bull., vol. 8, No. 9, February 1966, p. 1266.

Publication II, Magneto-Optic Element, IBM Tech Discl Bull., vol. 9, No. 12, May 1967, p. 1753.

BERNARD KONICK, Primary Examiner

S. B. POKOTILOW, Assistant Examiner

U.S. Cl. X.R.

340—174